(12) United States Patent
Bangma et al.

(10) Patent No.: US 11,290,423 B2
(45) Date of Patent: Mar. 29, 2022

(54) QOS IN DATA STREAM DELIVERY

(71) Applicants: Koninklijke KPN N.V., The Hague (NL); Nederlandse Organisatie voor Toegepast-Natuurwetenschappelijk Onderzoek TNO, The Hague (NL)

(72) Inventors: Menno Bangma, The Hague (NL); Hans Maarten Stokking, Wateringen (NL); Frank Den Hartog, Melba (AU)

(73) Assignees: Koninklijke KPN N.V., Rotterdam (NL); Nederlandse Organisatie Voor Toegepast-Natuurwetenschappelijk Onderzoek TNO, 'S-Gravenhage (NL)

( * ) Notice: Subject to any disclaimer, the term of this patent is extended or adjusted under 35 U.S.C. 154(b) by 0 days.

(21) Appl. No.: 15/329,146

(22) PCT Filed: Jul. 28, 2015

(86) PCT No.: PCT/EP2015/067217
§ 371 (c)(1),
(2) Date: Jan. 25, 2017

(87) PCT Pub. No.: WO2016/016215
PCT Pub. Date: Feb. 4, 2016

(65) Prior Publication Data
US 2017/0222973 A1  Aug. 3, 2017

(30) Foreign Application Priority Data
Jul. 29, 2014  (EP) .................................. 14178918

(51) Int. Cl.
*H04L 29/12* (2006.01)
*H04L 61/2567* (2022.01)
*H04L 47/10* (2022.01)
*H04L 12/66* (2006.01)
(Continued)

(52) U.S. Cl.
CPC .......... *H04L 61/2567* (2013.01); *H04L 12/66* (2013.01); *H04L 47/10* (2013.01); *H04L 47/24* (2013.01); *H04L 67/26* (2013.01)

(58) Field of Classification Search
CPC ............. H04L 61/2567; H04L 61/2514; H04L 61/2575; H04L 67/26; H04L 47/24;
(Continued)

(56) References Cited

U.S. PATENT DOCUMENTS

2003/0084162 A1* 5/2003 Johnson .................. H04L 29/06
709/227
2009/0300687 A1 12/2009 Quigley et al.
(Continued)

FOREIGN PATENT DOCUMENTS

EP        2648371 A1    10/2013
WO   WO2013127360 A1    9/2013

OTHER PUBLICATIONS

PCT International Search Report and Written Opinion, PCT International Application PCT/EP2015/067217 dated Sep. 15, 2015, 9 pages.
(Continued)

*Primary Examiner* — Ricardo H Castaneyra
(74) *Attorney, Agent, or Firm* — McDonnell Boehnen Hulbert & Berghoff LLP (57) ABSTRACT

A system for managing a data stream between first and second networks is described in which a node entity transmits a data stream addressed to a destination device in the second network and a gateway entity receives the data stream from the first network. The gateway entity identifies at least one characteristic of the destination device and transmits it to the node entity in the first network in such a way that the characteristic is relatable to the data stream. The node entity receives the characteristic of the destination
(Continued)

device from the gateway entity and relates it to the data stream and performs Quality of Service management on the data stream based on the at least one characteristic. A gateway device and a method of managing a data stream are also described. The system, gateway, node and method extend the application of QoS performance and management.

16 Claims, 6 Drawing Sheets

(51) Int. Cl.
  *H04L 47/24* (2022.01)
  *H04L 67/55* (2022.01)
(58) Field of Classification Search
  CPC ... H04L 47/805; H04L 12/66; H04L 12/2834; H04L 12/2818; H04L 45/74; H04L 63/02; H04L 47/10; H04L 65/80; H04L 49/205; H04L 45/302; H04L 67/22; H04W 88/16; H04W 8/005; H04W 48/16; H04W 24/02; H04W 56/001; H04W 28/0268; G06F 3/0679
  See application file for complete search history.

(56) References Cited

U.S. PATENT DOCUMENTS

| | | |
|---|---|---|
| 2010/0232441 A1 | 9/2010 | Verma et al. |
| 2011/0299410 A1 | 12/2011 | Diab et al. |

OTHER PUBLICATIONS

Hwang, Wen-Shyang et al., "Quality of Service for IMS on Fixed Networks", Technology White Paper, Alcatel, 2006, 10 pages.
Hwang, Wen-Shyang et al., "A QoS-aware Residential Gateway with Bandwidth Management", IEEE Transactions on Consumer Electronics, vol. 51, No. 3, Aug. 2005, pp. 840-848.
Mohomed, Iqbal et al., "Context-Aware Interactive Content Adaptation", Proceedings of the 4th International Conference on Mobile Systems, Application and Services, ACM, 2006, pp. 42-55.
Alcatel, Quality of Service for IMS on Fixed Networks, Technology White Paper, 2006.
Hwang, Wen-Shyang, and Pei-Chen Tseng. "A QoS-aware residential gateway with bandwidth management." Consumer Electronics, IEEE Transactions on 51.3 (2005): 840-848.
http://nmap.org.
http://en.wikipedia.org/wiki/TCP/IP_stack_fingerprinting.
http://browserspy.dk/.
Mohomed, Iqbal, et al. "Context-aware interactive content adaptation" Proceedings of the 4th international conference on Mobile systems, applications and services. ACM, 2006.
Broadband Forum, TR-069 Amendment 4 CPE WAN Management Protocol, Jul. 2011, see http://www.broadband-forum.org/technical/download/TR-069_Amendment-4.pdf.
Broadband Forum, TR-098 Amendment 2 Internet Gateway Device Data Model for TR-069, Sep. 2008, see http://www.broadband-forum.org/technical/download/TR-098_Amendment-2. pdf.
Broadband Forum, TR-181 Issue 2 Amendment 6 Device Data Model for TR-069, Nov. 2012, see http://www.broadband-forum.org/technical/download/TR-181_Issue-2_Amendment-6.pdf.

* cited by examiner

QOS IN DATA STREAM DELIVERY

CROSS REFERENCE TO RELATED APPLICATIONS

The present application is a national stage entry of, and claims priority to, PCT/EP2015/067217, filed on Jul. 28, 2015, which claims priority to European Patent Application EP 14178918.0, filed in the European Patent Office on Jul. 29, 2014, both of which are hereby incorporated in their entirety herein by reference.

The invention relates to a system for managing a data stream between a first network and a second network, a gateway device for routing data streams between a first network and a second network, a method of managing a data stream between a first network and a second network and a node entity comprised in a network.

BACKGROUND TO THE INVENTION

Electronic devices for accessing, handling, presenting and viewing data are commonly connected into networks and in particular this is increasingly usual in domestic environments. Such networks in a domestic environment frequently include, amongst others, computers and PCs, laptops, tablets and other mobile devices, mobile phones and also set-top boxes for television viewing. The devices in these networks can share data with each other but also connect to wider networks, such as the internet, to receive content such as TV programs, videos, downloads, programs and internet services etc. A small network, such as a domestic network, is usually connected to these wider networks via a gateway device. In the case of a domestic network the gateway device is frequently referred to as a home gateway, or HG. The HG channels, or routes, data streams between the home or domestic network and a wider, public, network, such as the internet, and performs some management functions. The data link between the HG and the wider network is frequently referred to as an access link, or access line, and connects the HG to some sort of node, an edge node, at the edge or periphery of the wider network. The wider network is sometimes referred to as an access network because it offers the domestic network access to a public network or a wider net of public networks. The access network is managed or run by the operator providing internet services to the respective domestic environment.

There are several problems associated with successfully delivering content to a device in a domestic network through a gateway device or home gateway.

When multiple devices in the home or domestic network receive data, such as video data or file downloads, from the internet the various data streams will contend for bandwidth on the bandwidth limited access line. The access link, usually consisting of xDSL or DOCSIS solutions, is typically a bandwidth bottleneck. Inside a local network, such as a home network, more bandwidth is often available than on this access link, and similarly, more bandwidth is usually available on the other side of this access link in the core network. If multiple data streams contend for the same limited bandwidth on the access link then there may be insufficient bandwidth to carry all data streams simultaneously without delay or error. To prevent errors and mishaps due to insufficient bandwidth various Quality of Service, or QoS, solutions have been developed to manage the various data streams. Such solutions may use access control mechanisms, for example disallowing some streams in favour of others, or priority mechanisms for example giving right of way, or giving priority, to some streams while delaying other streams. Examples of managing QoS in a managed network architecture include the 3GPP PCC (Policy & Charging Control) architecture or the RACS (Resource & Admission Control Subsystem) within the IMS architecture. Another possible QoS solution uses VLANs which approximates a permanent network channel on layer 2, the Ethernet layer, and which can reserve bandwidth on this layer. Different VLANs can be given a different priority or service class thereby allowing QoS differentiation between VLANs. This technique is for example used in current IPTV deployments. Other techniques include DiffServ, using priority parameters in the various streams, and IntServ, which is a complete end-to-end system for managing QoS.

The number of devices in a single household is typically increasing and multiple managed and unmanaged devices are being used for various purposes and this also creates problems. Previously a local network might consist of only one or perhaps a few computers, but now most home networks include multiple PCs and laptops, one or more tablets, connected TVs, smartphones using the local wifi and streaming devices including set-top boxes. Further, many of these devices are now also multi-purpose devices and are used for accessing a variety of different services both local and remote. Traditionally a set-top box would be connected in a different way from other devices, having its own connection to the core, or operator, network, frequently using a VLAN. This was possible because the set-top box only needed a connection to the IPTV platform of the provider. This has now changed because this same set-top box also now needs to access services by other providers, for example streaming services on the internet, and also needs local connections, for example for accessing media content on a Network Attached Storage or for allowing a tablet to control the set-top box or accessing recorded content on the set-top box. The current VLAN technology used for managing QoS to the set-top box is therefore no longer sufficient as it does not allow local connections to other devices in the local network.

Solutions to manage the QoS of the various streams are typically limited, in part because managed network solutions can only offer QoS for their own services. These services originate from a server in the operator's domain and are typically separated on a logical level from other internet traffic, which itself can usually only be transported across the operator network as 'best effort', as is understood by the skilled person. For example, when a user is watching a video stream on a device from a video on demand, or VoD, service provider, then this video stream can be disturbed by the occurrence of a simple file download, for example, to another device in the local network. A file download will typically increase its download speed until the maximum allowed bandwidth on the access line is achieved. Once this occurs the download process will be competing with the video stream for the bandwidth available. Video streaming services may quickly result in bad user experience in the case of a temporarily reduced bandwidth due to the additional needs of the file download, while the file download only takes a little longer to complete due to the presence of the video being streamed across the same access line. In general it is the case that some services are affected much more by temporarily bandwidth reductions than others and would therefore benefit from a higher QoS than others, for example by being given right of way, in other words given priority.

It is possible to provide a video streaming service with a higher priority in the core and access network of the operator. One problem, however, is how to first recognize such a video stream and tag it in the operator network so that it can be transported with higher priority. Recognition is typically done through Deep Packet Inspection, DPI, or the data for delivery is identified, as a video stream for example, by the location of the origin of the streams.

The latter requires a large administrative effort. Such process is further complicated by the fact that most service providers make use of Content Delivery Networks, CDNs, in order to distribute their content through the internet which means that content originating from one internet address, Address1 for example, where Address1 is in the form of a suitable internet addressing protocol, is actually typically provided to the operator network from an originating address of the CDN provider, Address2 for example. The origin of the content therefore becomes obscured and it becomes complicated and cumbersome to assign a higher priority based on the originating address of the service.

Deep packet inspection, DPI, for example at the edge node, could be used to analyse all traffic and would allow detection of the services used, following by QoS performed on a service level. However this approach also has a number of downsides. It is quite cumbersome to perform deep packet inspection and does not always produce the desired result, for example due to increased use of encryption of data streams. Also, a considerable amount of traffic is transported through the HTTP protocol which makes it more difficult to distinguish video streams from simple downloads.

Even if a certain type of service, like a video streaming service, is provided with a higher priority in the core and access network of the operator, problems with delivery remain. For example there is a big difference, for the user, between watching a short video clip on a smartphone or tablet and watching a film or movie on a home theater setup, yet both data streams are likely to produce the same or similar result from a DPI and both data streams can originate from the same source. In the first case, when viewing on a smartphone or tablet device, small problems during viewing while annoying are not necessarily important. In the second case, when the user is viewing on a home theater setup problems during viewing could entirely ruin the user experience.

However, further problems occur due to the use of Network Address Translation, NAT, which is often used on the HG for connecting the local network with the public network. The use of NAT is highly advantageous when there is more than one device in a local network because it allows multiple devices in the home network to share the same public IP address as used in the wider internet, and this saves the number of addresses that are required in the public IP address protocol. To accomplish this, NAT translates between private IP addresses and port numbers used by the devices in the local network and, usually, one public IP address for the HG with different port numbers allowing multiple data streams to enter the local network from outside through the HG's public IP address. As is understood by the skilled person these mappings between internal and external addresses and ports are stored in a NAT table which allows the NAT to find the local destination for incoming traffic. Typically such incoming traffic is response traffic, in other words data streams in response to a previously outgoing request. However devices in the local network are behind the HG and the local address of any local destination device, and indeed even knowledge of the device itself and its characteristics, is unknown outside the local network and therefore unknown to the core network. This makes NAT a hindering functionality between the local network and any entity or node in the public network or internet attempting to deliver data streams or manage delivery of data streams or probe behind the HG. Since the devices behind a HG with NAT are shielded from the external entity it typically has no knowledge of what they are or what capabilities they have.

Also, not all services or data to a destination device are delivered by a single service provider so even if a particular delivering entity itself had knowledge of the specific devices within a particular home network, for example if it had delivered to a particular destination device previously, that entity might not be the only entity delivering services to that destination device, or even that network.

'Context-aware interactive content adaptation', Mohomed, Iqbal, et al, Proceedings of the 4th international conference on Mobile systems, applications and services, ACM, 2006, describes content adaptation as a QoS measure and analyzes the influence of contextual factors on content adaptation. In an arrangement content is adapted for mobile devices based on usage semantics, a degree of user interaction and on measures of how favourably contextual measures have been previously received. 'Quality of Service for IMS on Fixed Networks', Technology White Paper, Alcatel, 2006, describes known QoS mechanisms in a managed network. 'A QoS-aware residential gateway with bandwidth management' by Hwang, Wen-Shyang, and Pei-Chen Tseng, Consumer Electronics, IEEE Transactions pages 840-848, describes an arrangement in which a HG performs QoS using traffic classes.

It is a problem to efficiently manage delivery of data streams in a network.

SUMMARY OF THE INVENTION

The problem is solved according to the invention as described in the claims and which includes a system for managing a data stream between a first network and a second network in which the system comprises a node entity in the first network and a gateway entity situated at a boundary between the first network and the second network. The node entity is configured to transmit a data stream addressed to a destination device in the second network. The gateway entity is configured to receive the data stream from the first network and is further configured to identify at least one characteristic of the destination device, and also transmit the at least one characteristic of the destination device to the node entity in the first network in such a way that the at least one characteristic is relatable to the data stream. The node entity is configured to receive the at least one characteristic of the destination device from the gateway entity, and further relate the at least one characteristic of the destination device to the data stream, and also perform Quality of Service management on the data stream based on the at least one characteristic.

The first network is typically a public network, or internet, and comprises a node entity which is typically, but not necessarily, an edge node, in other words a node at the edge of the network. The node entity is a node in the first network from which data streams can be routed or otherwise sent to the second network, this might usually be an edge node but could also be a node deeper in the public network. The second network is typically a domestic or other local network, a network situated in a home or domestic environment or, for example, a small commercial network or a small network in an educational institution. Typically the first network will be run and maintained by an operator providing internet services to the second network. The gateway entity is typically a gateway device, but can also be a combination of single gateway device and Provider NAT but can also be a combination of single gateway device and DHCP server. The DHCP server, when present, can be incorporated into a gateway device or may be a separate entity. Typically a gateway device, or entity, is situated at the boundary between the first network and the second network and routes or otherwise transmits data streams received from the first network, via the node entity, to the respective destination device in the second network.

The gateway entity or device is able to identify at least one characteristic of the destination device. The characteristic may be any characteristic that might affect the way in which a data stream could be delivered to the device, or which might affect the way in which the device itself handles the data stream. Suitable characteristics include, but are not limited to, device type, screen size, screen resolution, size or amount of memory in the device, type of memory in the device, and network connection bandwidth.

The gateway device or entity may identify the characteristic in a number of ways. It may detect the characteristic itself, or may acquire the characteristic from another device, for example the device itself may be programmed to transmit the characteristic to the gateway device. The characteristic may be programmed into the gateway device manually or via upgrade, for example a remote management action, across the internet.

Typically, once the gateway device or entity has acquired a particular device characteristic it will store it in memory for subsequent retrieval.

The gateway device or entity is able to transmit the at least one characteristic of the destination device to the node entity in the first network in such a way that the at least one characteristic is relatable to the data stream. In other words the gateway device transmits the characteristic either with some further identifying data allowing some further entity, or the node entity itself, to relate the characteristic to some identifier of the data stream or destination device or device type, or alternatively the gateway device may transmit the characteristic in response to a specific request concerning a particular device.

The node entity is able to receive the characteristic of the destination device from the gateway device and also relate that characteristic to a data stream intended for that device. By doing so the node entity is able to pair off specific device characteristics to data streams and thereby has a powerful tool to aid data stream management. Because the node entity can now relate a data stream to characteristics of the intended destination device it can perform Quality of Service to the data streams based on reliable knowledge of the device. The node entity therefore also performs or otherwise applies Quality of Service management on the data stream based on the at least one characteristic.

The invention thereby allows QoS to be performed by an entity, even on streams going to devices held in a local network behind a gateway device, or gateway entity.

This invention uses device characteristics of the destination device, provided by the gateway entity and which otherwise would not be known outside, or be discoverable from outside, the local network, to help determine the QoS settings to be used in delivering data streams to that device.

Using the arrangement of the invention the gateway device detects or otherwise collects device characteristics, finds or otherwise identifies the appropriate NAT bindings for the device and provides this combined information to the core network for QoS managed purposes.

In a further embodiment the data stream comprises a first address of the destination device and this is an address defined in the first network. Typically this will be an IP address, or an address according to another accepted address protocol, and which will allow the HG, upon receiving the data stream, to deliver it to the correct device in the local network. In this embodiment the gateway device is able to transmit the characteristic of the destination device to the node entity in such a way that it is relatable to the first address of the destination device. In other words the gateway device either transmits the characteristic along with an indication of the address, for example as a data couplet or similar, or receives a request for a characteristic in which the request itself details the device address. In the latter case the gateway device replies to the request with the characteristic and in doing so the characteristic can be related to the correct address at the receiving entity.

In a further embodiment the gateway device itself can detect the device characteristic of the destination device in the second network and store it. This embodiment is particularly useful during or after the setting up of a local network, or when a new device is added to an existing network. Here the gateway device, upon being installed, queries devices it is connected to in order to receive information about their characteristics. If a new device is added to the network the gateway device, upon detecting the new device, queries it for characteristics. Alternatively, upon being added to a new or unknown network a device can offer details of its characteristics to the gateway device. Functionality allowing such a transfer of information between gateway and network devices can be programmed into them.

In a further embodiment the gateway device is programmed or otherwise configured to use a NAT table and allocate a port to at least one device in its local network and use the NAT table to provide information to which the device characteristic can be related. For example, the gateway can use the NAT table to associate the characteristic with the correct external address and transmit the characteristic with reference to the external address. Alternatively the gateway device can transmit a device characteristic to the node entity in combination with information from the NAT table identifying the internal, second network, address of the respective device. For example if the complete NAT tuple for a stream (internal IP+port, external IP+port) is sent to the node entity, so the node entity can figure out which characteristic belongs to which data stream. Additionally, the gateway can store the device characteristic in such a way that it can be related to the information in the NAT table, for example to a public address of the device, for example an IP address, or alternatively a combination of IP address and port number.

In a further embodiment the gateway device is configured to push information concerning the at least one device characteristic to the node entity, or network node. In this embodiment the gateway device is able to transmit device characteristics without first receiving a request for the characteristic, for example either as soon as the gateway device acquires, detects or otherwise receives the device characteristic, or alternatively, when the gateway device starts to receive incoming data streams for a device that do not already include QoS provision.

In an alternative embodiment the gateway device is configured to receive a request from the node entity, or network node, for information related to at least one device characteristic and the gateway device is configured to deliver the information upon request. In this embodiment the node entity controls the process of device characteristic delivery and this embodiment offers advantages to a network handling heavy traffic because it allows the node entity to request device characteristics only when it needs them or when it is able to utilise them, for example it may request characteristics of a device only when data streams for a particular destination device require actual delivery, when the network actually becomes congested, or alternatively for example when the node entity has the capacity to handle to the extra information incorporated in the device characteristic and in applying the device characteristic to perform QoS management. The last example allows the network to apply QoS only when it has sufficient network resources to do so.

In a particular embodiment the network node can be a DSLAM. In a further particularly useful embodiment the second network is a home network and the gateway entity is a home gateway device.

The invention also relates to a gateway device for routing data streams between a first network and a second network. In this case the gateway device is configured to receive a data stream from the first network intended for a destination device in the second network and is further configured to identify at least one characteristic of the destination device and transmit the at least one characteristic of the destination device to the node entity in the first network in such a way that the at least one characteristic is relatable to the data stream.

The first network is typically a public network and the second network is typically a local network, distinct from the first network. The gateway device is at the border between the first and second network and may have a management function within the first network.

The gateway device may identify the characteristic by retrieving it from memory. Alternatively it may acquire the characteristic from another device, for example from the device itself which may be programmed to transmit the characteristic to the gateway device. Alternatively, the characteristic may be programmed directly into the gateway device either manually or via upgrade across the internet or other public or private network. Once acquired the gateway device may store the device characteristic for later or further use.

In a further embodiment the gateway device is programmed, configured, arranged or otherwise able to identify the characteristic by detecting it. In a further embodiment the gateway device will further store the characteristic in memory.

In a particular embodiment the gateway device is arranged to detect characteristics of a destination device and identify the destination device before a data stream is actually received for that particular destination device. In this embodiment the gateway device is arranged to acquire the necessary information about device characteristics before it is needed. The information can then be provided when it is required for data stream delivery. In order to perform this embodiment the gateway device acquires a destination device characteristic, either by detecting it or otherwise acquiring it, through programming for example, and then stores it for future use when it is needed. The gateway device can be pre-programmed to detect and store, or receive and store, characteristics of the devices coupled to it in a network. The gateway device stores the characteristic in relation to, or along with, some identifier of the destination device. The identifier may be an address, for example a local network IP address, a MAC address or other identifier, and to do this the gateway device also identifies the potential destination device. However, while Local network IP address is a valid identifier it may change over time therefore it may not be the optimal solution for identifier, and as such MAC address is preferred. However with DHCP the same IP address is usually assigned to a device using the MAC address and if that is the case the internal IP address will remain the same over time as well and can be used as an identifier. Also, if static IP addresses are used, they will also remain the same over time as well, and can thus be used as an identifier.

In a further embodiment the gateway further transmits characteristics of the destination device to the first network upon request by the first network. In this embodiment the gateway device is configured to receive a request for information related to at least one device characteristic from a further entity, possibly a network node or other network entity. The gateway device is configured to deliver the information to the other entity upon request.

In particular the device characteristic may include any of device type, screen size, resolution or network connection bandwidth.

In a further embodiment the gateway device also comprises a network address translation table for identifying the device.

The invention also relates to a method of managing a data stream between a first network and a second network, the data stream transmitted from a node entity in the first network through a gateway device situated at a boundary between the first network and the second network to a destination device in the second network. In this method the gateway device identifies at least one characteristic of the destination device and transmits the at least one characteristic of the destination device to the node entity in the first network in such a way that the at least one characteristic is relatable to the data stream. In this method the node entity receives the at least one characteristic of the destination device from the gateway device, relates the at least one characteristic of the destination device to the data stream, and performs Quality of Service management on the data stream based on the at least one characteristic.

In further embodiments of the method it is possible to perform any one of limiting the rate of delivery of a data steam; blocking a data stream; guaranteeing the bandwidth of a data stream; setting a priority parameter in the data stream; identifying a group of data streams; and setting the relative priority parameters of a group of data streams. Just setting one parameter in the data stream itself may be enough because if one stream is marked as 'high priority' routers can give it priority compared to unmarked data streams. These are all suitable QoS actions which might be performed on data stream to be delivered to a destination device, though other QoS actions are also possible.

In a particularly advantageous embodiment the data stream comprises a first address of the destination device by which the destination device can be identified in some way by both the gateway and any node or device situated in the first network and using the protocols typically used in the first network. This address is typically an IP address or uses some other known address protocol. In this further embodiment the gateway device transmits the at least one characteristic of the destination device to the node entity in such a way that it is relatable to the first address of the destination device.

In a further embodiment of the invention a home gateway actively pushes the information to a network node. The first step of this embodiment, device type detection, is known in the art. Different forms of detection are known and can be used alone or in combination. Possibilities include the use of discovery protocols such as UPnP, DLNA, Bonjour and the Service Location Protocol. These protocols allow a device to make itself known to the network via a broadcast and to exchange information on its capabilities. This method can be used actively, for example the home gateway, HG, sending out 'who is there?' requests, or passively, for example the HG listening to other devices sending messages.

Another possibility is the use of probing by the HG. This can be performed using management protocols such as SNMP to request devices for information. It can also exist of using probing tools such as Nmap (http://nmap.org/) or using existing probing tools such as Ping to discover information about devices in the local network.

Another possibility is passive listening, using TCP/IP fingerprinting to analyse network behaviour or using DPI in combination with browser identification algorithms as are known, to identify certain characteristics of devices and thus possibly also identifying device type, brand and model.

An alternative possibility is to perform MAC address lookup in a database, which requires setting up such a database, for example with all vendors of potential destination devices supplying information on which MAC address ranges are used in which devices.

An alternative possibility is manual configuration by the user, for example with the user filling out a web form on the HG. In an alternative to this the user fills out a form on a webpage provided by the network operator delivering data streams and the operator transmits this information downstream to the respective HG.

Once the HG has collected information on the device characteristics of the various devices in the local network, it typically stores this information and relates this information to the various data streams going through the HG. Storing the information can be undertaken in a way which is related to the device and thus requires some identifier for the device. This can be for example the MAC address of the device as this is persistent over time. The information can be stored in a way which is related to the IP address of the destination device, however this can change over time, particularly if it is dynamically allocated by DHCP. However for short term use it offers the advantage that it is easier for the HG to perform because the port number included in the IP address is allocated by the HG using NAT whereas the MAC address of a device is allocated at production and has to be acquired in some way by the HG before it can use it.

Information in the NAT table consists of 2 tuples of information, the local IP address and port number used by the local device, and, the public IP address and port number allocated by the HG for routing packets on the public network. The information is mapped to the internal IP address, because that is the IP address that identifies the local device, at least for as long as this IP address remains allocated to the specific device. Next, this internal IP address can be looked up in the NAT table to find public IP address or addresses and port numbers of data streams going to this specific device. A device can have multiple incoming data streams at the same time, so a single MAC address can be associated with one or more tuples of public IP address and port number.

In a third step, the HG sends this information to the network node, i.e. one or more tuples (public IP address, port number) related to a specific device and one or more device characteristics of that device. This can be done using any protocol suitable for this purpose, either standardized or not. For example, the information can be encoded using an XML schema and then be sent to the network node using HTTP or SOAP etc. The information can also be encoded in other schema's and other transport protocols can also be used.

The network node receives this information and will temporarily store it, because the information is only relevant for moments that QoS management will be performed. This can be done almost continuously, for example every time a new data stream is started it can be allocated some kind of priority class, or could be allowed/disallowed. It can also be done as needed or 'on demand', for example when the bandwidth of the access line is congested or overused or is causing a backlog due to the weight of traffic. Once the supplying network has access to device characteristics of receiving devices the QoS control algorithms and QoS enforcement measures which can be used are well known in the art.

In an alternative embodiment of the invention a home gateway delivers the information on request to the network node. The discovery, store characteristics and perform QoS management steps are similar to the push example. However in this embodiment the step of informing the network node is performed differently. In this example, the network node performing the QoS will request the information, typically when deemed necessary. For example when a network node discovers increasing use of the access line or discovers congestion it can request the information from the HG. The disadvantage of this is that it will take some time to receive the information, and QoS management can only be performed after the information is received. However the advantage is that when there is no network delay there is no use of the network for sending the information and no storage means are needed for storing this information in the network node.

The invention also relates to a node entity comprised in a first network and configured to transmit a data stream addressed to a destination device in a second network. The node entity is configured to receive at least one characteristic of the destination device from the second network, relate the at least one characteristic of the destination device to the data stream, and perform Quality of Service management on the data stream based on the at least one characteristic. The node entity comprises processing and typically a storage or memory and receives some characteristic or other data determinative of characteristics of a destination device to which the node transmits a data stream. The data stream may be transmitted in its entirety in one continuous transmission or may be split up into sections for transmission sequentially, contiguously or separated by temporal gaps. The processing is configured to allow the node to receive and recognise the characteristic or other data and to relate it to the destination device using some form of identifier. The identifier for the destination device may also be received by the node from the second network. Alternatively the node may receive the identifier from elsewhere in the first network or it may be inputted directly at the node. Alternatively, the node may transmit a request to the second network for the characteristic and transmit to the second network an identifier for the destination device. The identifier may typically be the public address of the destination device. The node then receives the characteristic in reply to the request.

The node typically transmits the data stream to the public address of the destination device. As is known by the skilled person this public address is typically held by a gateway device or other entity at the boundary between the first and second networks.

The invention allows the characteristics of a receiving, or destination, device to be used in a QoS policy for the downstream traffic to a home or domestic network and in which the gateway device, or entity, queries devices it is connected to in order to receive information about their characteristics because this cannot typically be done from outside the home or domestic network.

In fact the invention is also suitable for non-domestic networks, for example commercial networks, and other networks which contain destination devices and which are separated by a gateway device from the network which provides or delivers a data stream to the destination device. Providing device characteristics to a QoS policy outside the network of the device itself provides advantages in data stream delivery. For example a video stream delivered to a 50" television screen is likely to be functionally experienced by the user in a very different way to, say, a data stream delivered to a desktop PC. While the network which delivers both may not be able to accurately predict what the user requirements will be for the experience of either, certain assumptions can be made based on knowledge of the device upon which either will be received, the destination device. If the destination device is a television with a large screen it is likely the user will wish to experience the delivered data stream with as little temporal corruption, breaks and distributed buffering as possible and with uncorrupted sound files. If the destination device is a desktop PC it is less likely the user will intend to view the data stream immediately and it is more likely the user will simply wish to receive the stream as an error free file. The device characteristics of the receiving, destination, device can therefore be a solid basis on which to apply QoS metrics.

A main obstacle to overcome for downstream traffic, in other words traffic travelling from an origin network, a WAN, to a destination network, a LAN, is that the destination device is invisible to the WAN due to the use of NAT, or a firewall. This means that firstly characteristics of devices behind the NAT or firewall, those in the local network, are not detectable from the outside, but secondly all traffic gives the impression of going to the HG as destination, because it is the HG which carries the public address of all the devices in its own network. This obstacle can be overcome by having the HG detect the device characteristics, checking the current NAT mappings or equivalent system being used for addressing internally in the LAN, and informing the QoS applying network node of this. At the node itself, the management of QoS can be any measure known in the art such as rate-limiting certain data streams, blocking certain data streams, guaranteeing the bandwidth of certain streams, setting relative priority parameters, etc.

In this way, the limitations in the prior art are overcome. This solution is applicable in case all traffic is carried 'over-the-top', it does not require the keeping track of any and all sources of traffic and does not require deep packet inspection to differentiate between streams. Instead it adds an additional dimension on which to carry out QoS control, either standalone or in combination with existing QoS mechanisms as known in the art.

BRIEF DESCRIPTION OF THE DRAWINGS

These and further embodiments of the invention are shown in the Figures.

DETAILED DESCRIPTION

Figure 1:
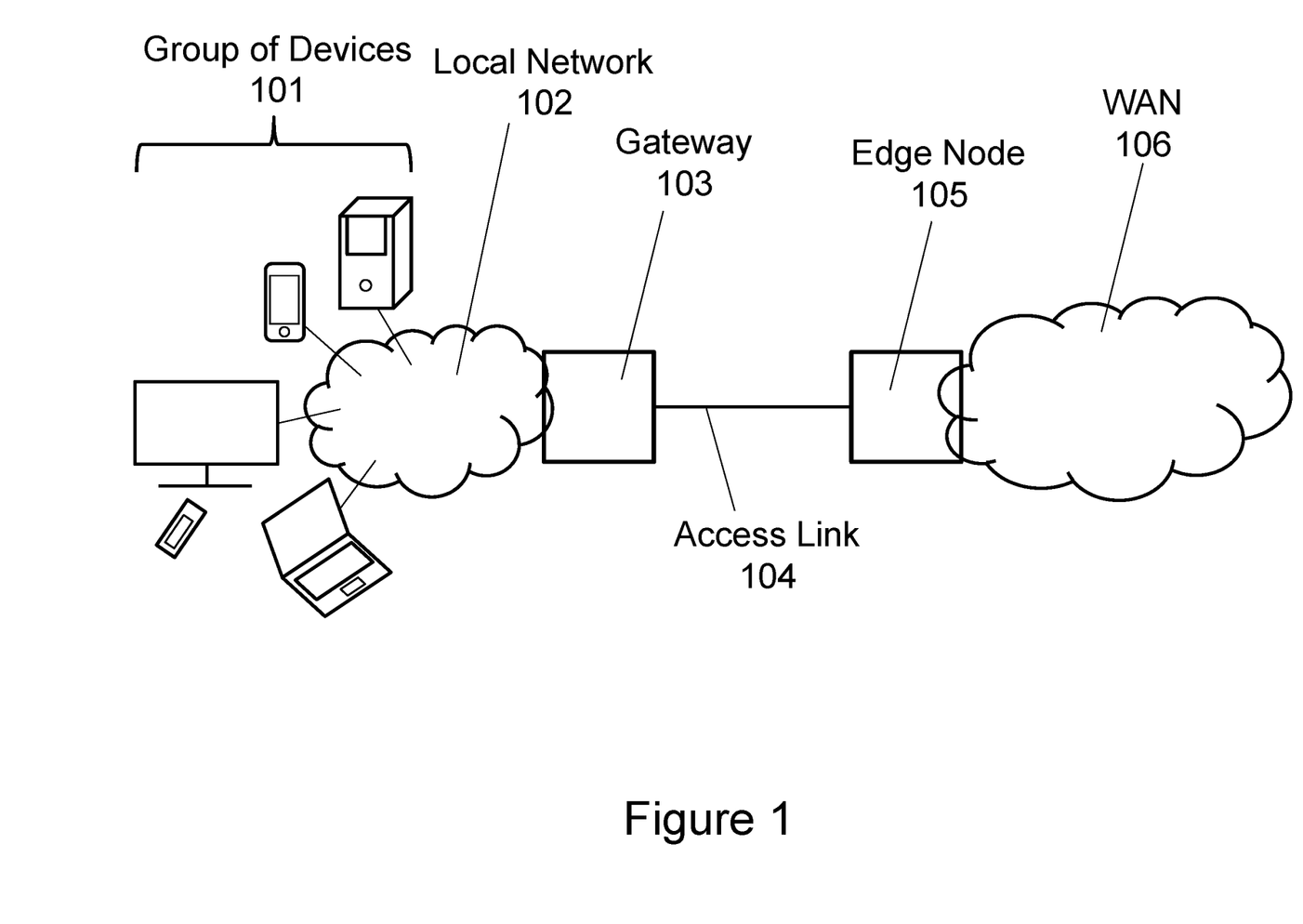
FIG. 1 shows a network arrangement in which the invention can be advantageously used.

FIG. 1 shows a network arrangement in which the invention can be advantageously used. A group of devices 101 are collected into a local network 102 which is connected by a home gateway, or gateway device, HG, 103 to an edge node 105 via an access link 104. The edge node 105 is part of a public or wider area network, WAN, 106. Within the local network 102 many devices and services are used. The HG 103 uses NAT to translate between WAN traffic and traffic in the local network. The problem of the arrangement is that the, typically, bandwidth-limited access link 104 disturbs the flow of data streams into network 102. The invention overcomes this problem by allowing meaningful QoS management to be applied upstream, in network 106, to downstream data traffic intended for network 102.

Figure 2:
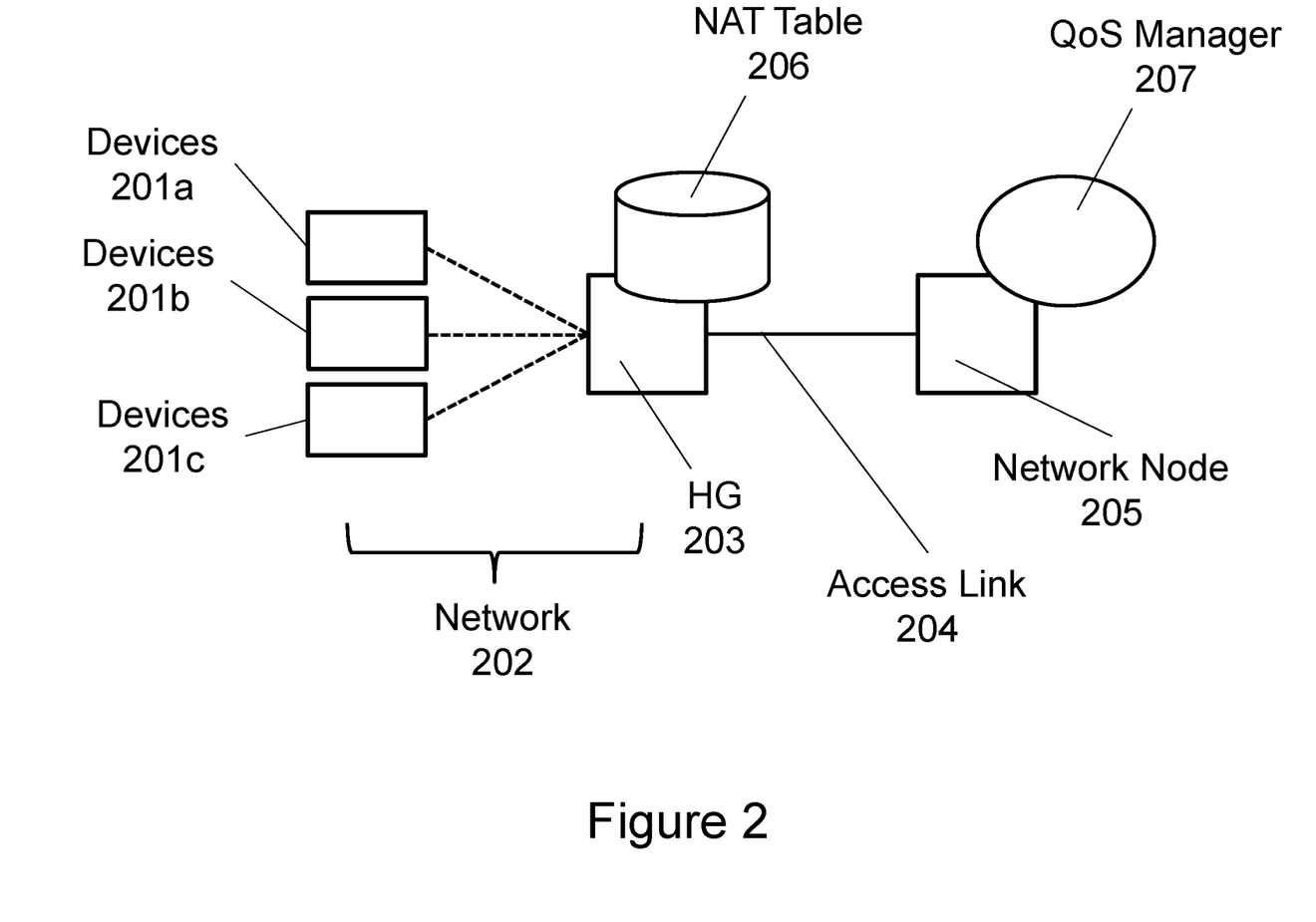
FIG. 2 shows an embodiment of the invention.

FIG. 2 shows an embodiment of the invention. Devices 201a, 201b and 201c are in a network 202 connected by a home gateway, HG, 203 to network node 205 by access link 204. HG 203 uses NAT and comprises a NAT table 206. Network node 205 comprises a QoS manager 207. Network node 205 might typically be an edge node because it may be advantageous for an operator network delivering data streams to network 202 to perform QoS near to delivery point. However, this is not necessary and node 205 may be deeper in the respective operator network and able to oversee QoS centrally for servicing a far greater number of domestic networks.

In the embodiment the HG 203 detects device characteristics of the various devices 201a, 201b, 201c in the local network or otherwise acquires details of their characteristics, for example via download from another source or via manual programming. Device characteristics include device type, screen size, resolution, network connection bandwidth, software and hardware capabilities etc.

HG 203 relates this device information to specific streams. This allows data streams to be delivered to devices 201a, 201b, 201c to be matched up to the correct device characteristics of the correct respective device 201a, 201b, 201c. Streams are identified in the NAT table 206 and are identified by the public destination IP address and port used.

The HG then sends this information to the network node 205 in the WAN over access link 204. This access node then performs QoS management using QoS manager 207 and in a specific further embodiment is a DSLAM in the operator network.

The network node 205 can then perform QoS management using QoS manager 207 and where QoS is based on the device characteristics of devices 201a, 201b, 201c as identified and transmitted by HG 203.

HG 203 can store the device characteristics alone or in combination with the address translation before sending them to node 205, or can simply transmit or send on the device characteristics to node 205 as soon as it acquires them. HG 203 can send device characteristics in combination with an identifier of a data stream in order to allow node 205 to marry up the data stream with the appropriate device characteristic for contemporary or future QoS. For example the identifier might be the address of the intended destination device and this has the advantage that node 205 can use this information to continue to perform QoS on streams which are part of the data delivery to that device and also perform future QoS on any other data stream intended for that specific destination device, however it can be any other type of identifier for a specific data stream. For future QoS performance any new data streams to a particular device will normally use a new NAT binding and thus a new port mapping, however, if the node entity stores the characteristics together with a local IP address (assuming, in this example, that this remains the same over time) then it will simply require the NAT binding information (i.e. internal IP+port, external IP+port) for new data streams and then it can perform QoS.

Alternatively HG 203 can be arranged to send the device characteristics in response to a request from a node upstream, for example node 205. In an alternative embodiment the request may be sent from any node upstream, not necessarily node 205, and this allows for management of the process to be started from some other entity within the WAN. In response to the request the HG 203 sends the device characteristics to node 205, or transmits them intended for node 205, and includes some signifier allowing node 205 or other receiving node to marry up, or relate, the transmitted device characteristic to the correct data stream or destination device.

Figure 3A:
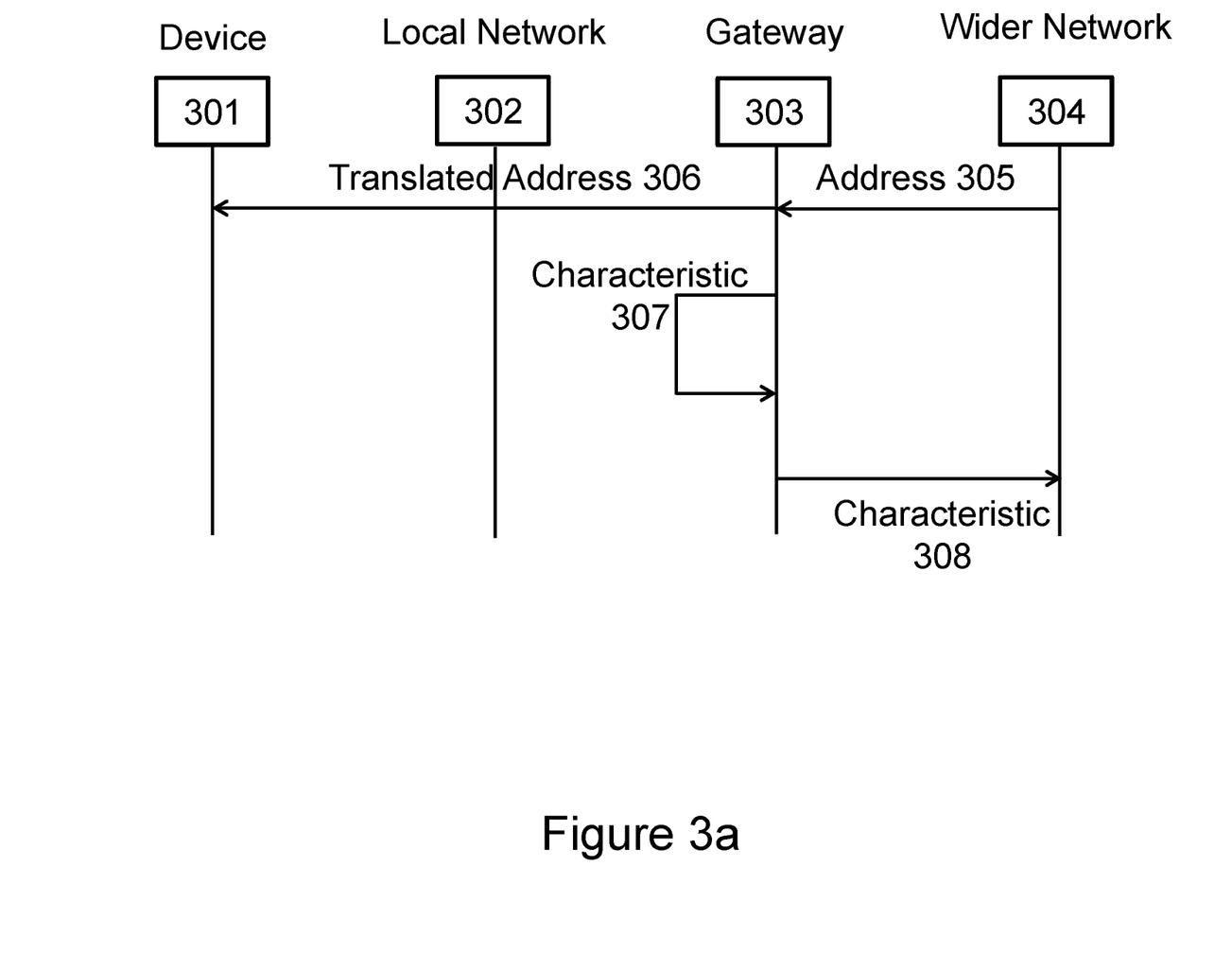
FIG. 3a shows a further embodiment of the invention.

FIG. 3a shows an embodiment of the invention. Destination device 301 is situated in local network 302 and is connected to gateway 303 which connects local network 302 to wider network 304. Device 301, as part of network 302, might be connected directly to gateway 303 or there might be an intervening entity which passes on any traffic between device 301 and gateway 303. Network 302 might be a simple star network comprising a handful of devices or may be a ring network or have a much more complicated structure with multiple pathways between devices. Alternatively, network 302 may comprise only one device, that being device 301. Wider network 304 sends a data stream for delivery to device 301 and using an address 305 according to a protocol used in the wider network 304. Gateway 303 receives the data stream with address 305 and translates the address into an address used in local network 302 and delivers it using that address 306. Gateway 303, having become aware that data streams will be delivered to device 301 retrieves a characteristic 307 of device 301 and transmits it 308 to network 304.

Figure 3B:
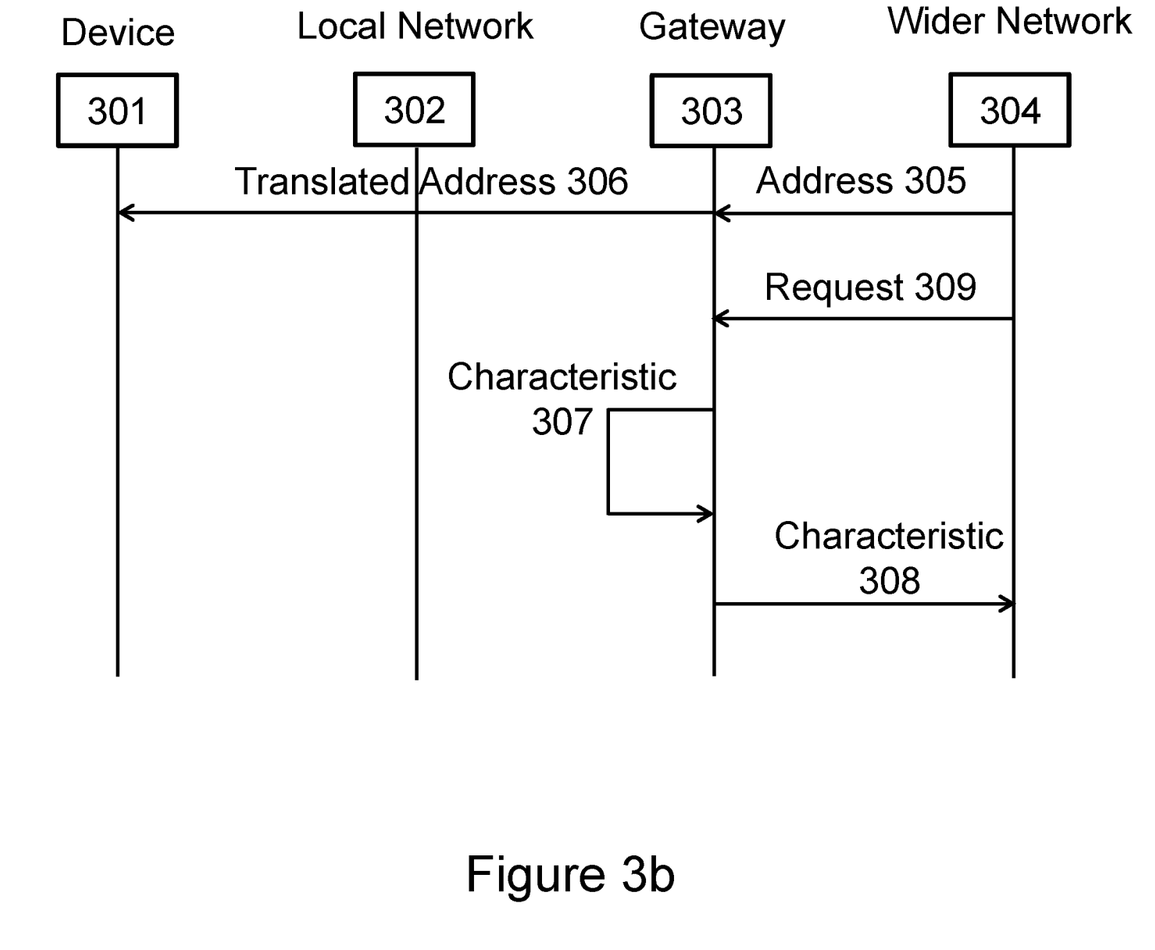
FIG. 3b shows an alternative embodiment of the invention

FIG. 3b shows an alternative embodiment of the invention. In this embodiment network 304 transmits a request 309 for a characteristic of device 301 and the gateway 303 retrieves the characteristic 307 upon or after receiving the request 309. After retrieving the characteristic the gateway 303 transmits it 308 to network 304.

Figure 4:
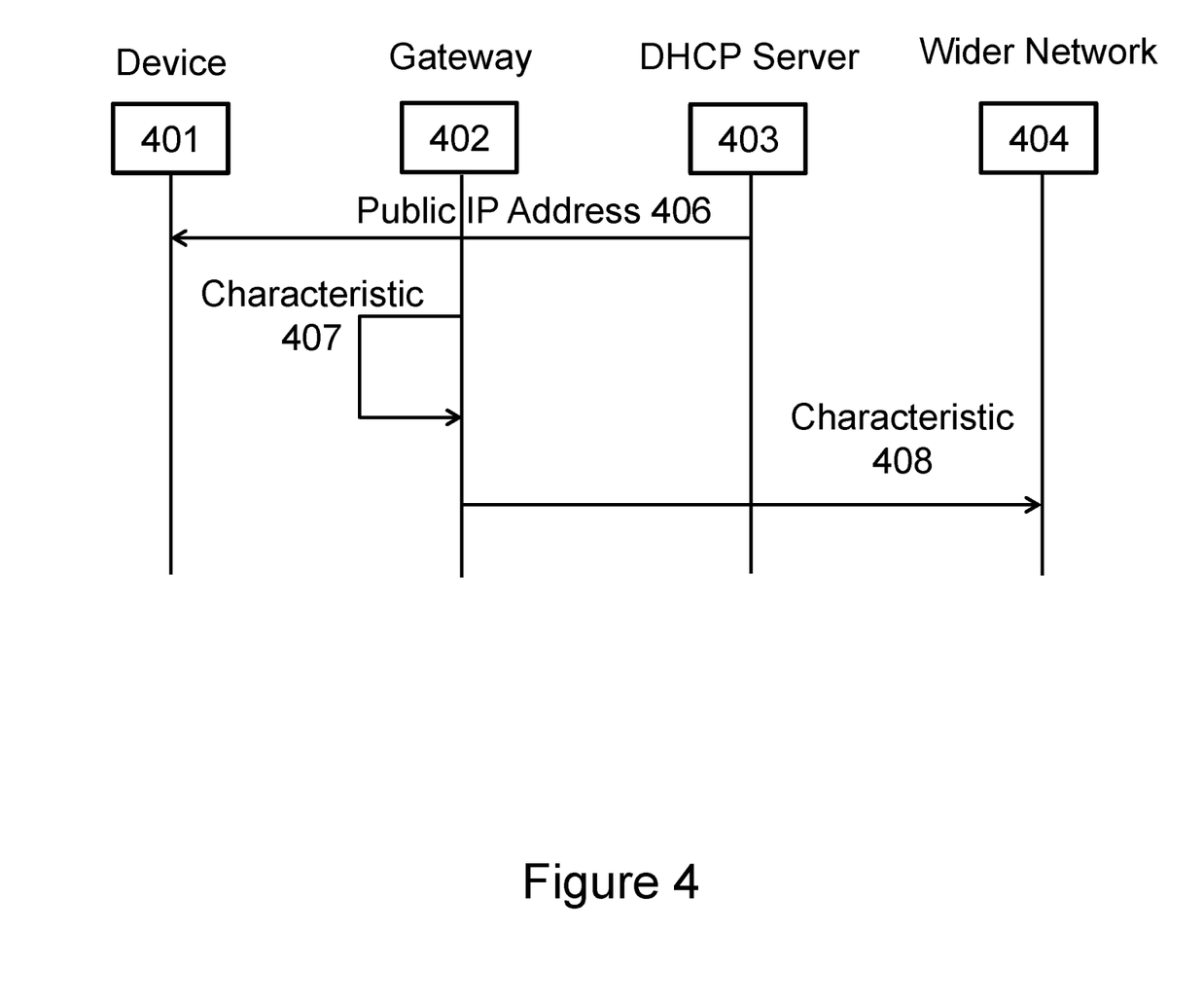
FIG. 4 shows a further embodiment of the invention.

FIG. 4 shows a further embodiment of the invention. In this embodiment device 401 is situated in a local network connected to a wider network 404 via a gateway 402 which does not use NAT but which comprises a firewall. Gateway 402 is coupled to DCHP server 403 which supplies a public IP address 406 to the destination device 401. The DCHP server is shown separate to gateway 402 but could be part of gateway 402. Network 404, however, still does not know the address, identity or any characteristic of device 401 because addresses are dynamically allocated at the DCHP server 403 and may thus change over time. In this situation the invention is worked as follows. Gateway 402 retrieves the characteristic 407 of device 401 and transmits it 408 to network 404 along with the address allocated by DCHP server 403.

Figure 5:
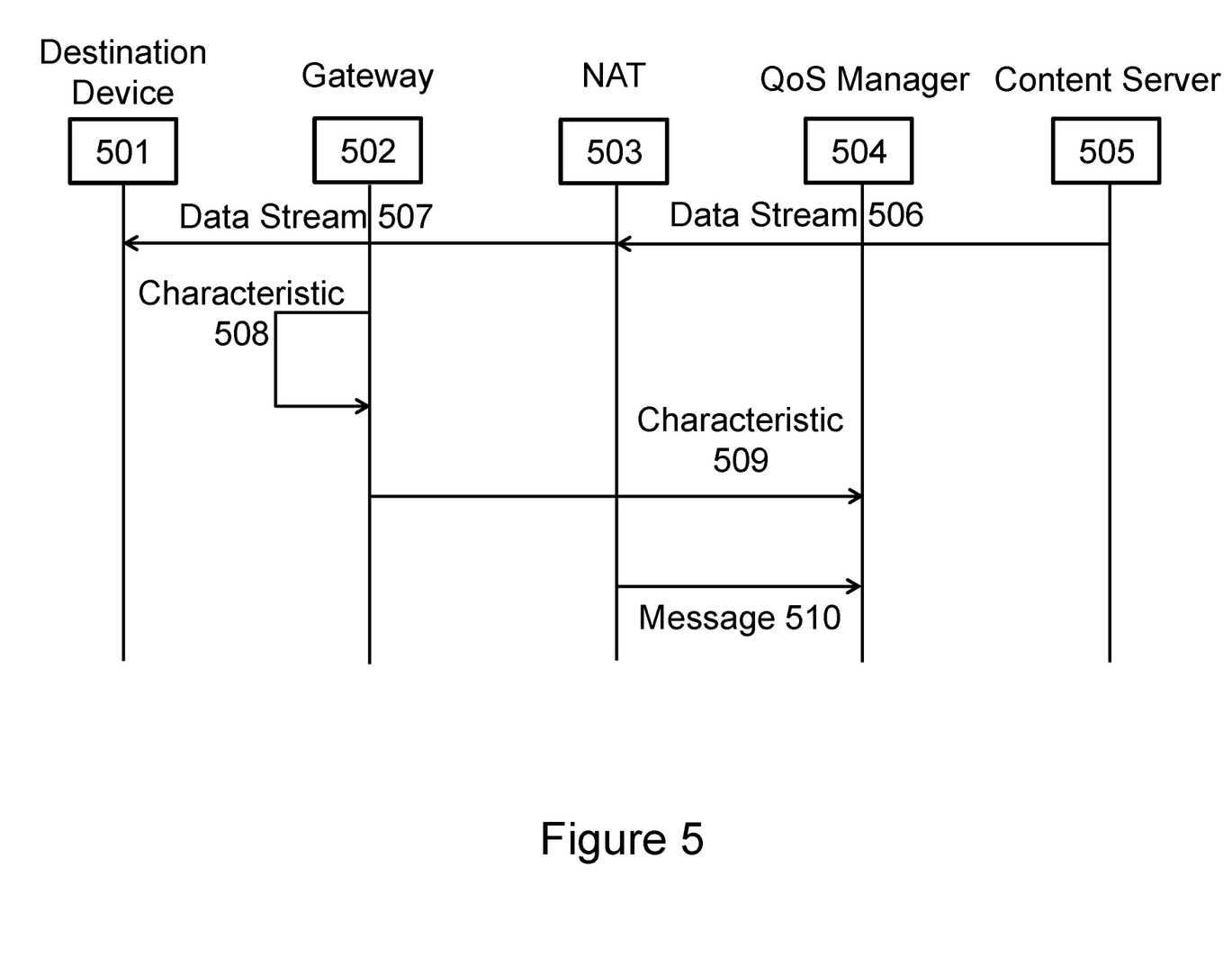
FIG. 5 shows a further embodiment of the invention.

FIG. 5 shows a further embodiment of the invention. In this embodiment destination device 501 in a local network is coupled to gateway 502 which does not use NAT. Instead, gateway 502 is coupled to a provider NAT 503, which is itself coupled to a content server 505 through a QoS manager 504. Content server 505 transmits a data stream 506 using an address protocol used outside the local network. Provider NAT 503 translates this address to an address used in the local network and transmits the same data stream 507 using the local address. Gateway 502 retrieves device characteristic 508 of device 501 and sends the characteristic 509 in combination with some form of local identifier, for example the local address, to the QoS manager 504. However, the QoS manager does not know the local addresses as used in the local network, therefore the provider NAT 503, which is the device which has allocated the local address and comprises the NAT table allowing translation between local and other addresses, transmits a message 510 including both local address and original address, as used in data stream 506, to the QoS manager 504. QoS manager 504 can now relate the local address to the address used in data stream 506 and can therefore relate public to local address for that data stream and can consequently perform QoS management on subsequent data streams intended for device 501. Provider NAT 503 can retransmit local and public address combinations when it changes the public address of device 501 or whenever data streams arrive for device 501. The provider NAT 503 can also see the MAC address of device 501 and as an alternative the gateway 502, or the provider NAT 503, can transmit messages 509 and 510 including the MAC address as identifier of device 501.

In alternative embodiments, not shown, gateway 502 transmits the device characteristic to provider NAT 503 which then provides the complete information to the wider network, or, the provider NAT 503 transmits the wider address, from data stream 506, plus local identifier to the gateway 502 which then transmits the characteristic with the wider address to the wider network.

The invention claimed is:
1. A system for managing a data stream between a first network and a second network, the system comprising:
   a node entity in the first network; and
   a gateway entity situated at a boundary between the first network and the second network,
   wherein the node entity is configured to transmit the data stream addressed to a destination device in the second network,
   and wherein the gateway entity is configured to:
   receive the data stream from the first network, wherein the first network is a wide area network;
   identify, by retrieving from memory, at least one characteristic of the destination device, wherein the at least one characteristic is device brand and model, screen size, size or amount of memory in the destination device, or type of memory in the destination device;
   transmit the at least one characteristic of the destination device to the node entity in the first network, wherein transmission of the at least one characteristic of the destination device is relatable to the data stream by at least one of inclusion of further identifying data in the transmission, or the transmission being responsive to a request from the node entity for information related to the at least one characteristic of the destination device;
   and further wherein the node entity is configured to:
   receive the at least one characteristic of the destination device from the gateway entity,
   relate the at least one characteristic of the destination device to the data stream based on at least one of the further identifying data in the transmission of the at least one characteristic of the destination device, or the at least one characteristic of the destination device having been received in response to the request from the node entity, perform Quality of Service management on the data stream based on the at least one characteristic of the destination device related to the data stream.

2. The system according to claim 1 wherein the data stream comprises a first address of the destination device and further wherein the first address is an address in the first network, and wherein the gateway entity is further configured to transmit the at least one characteristic of the destination device to the node entity, wherein transmission of the at least one characteristic is relatable to the first address of the destination device by at least one of inclusion of an indication of the first address in the transmission, or the transmission being responsive to the request.

3. The system according to claim 2 wherein the gateway entity is further configured to use a network address translation (NAT) table and allocate a port to at least one device in the second network and further where the gateway entity is configured to detect the at least one device characteristic of the destination device in the second network and store it in relation to, or with information indicative of, the first address and to the port used via the NAT table.

4. The system according to claim 1 wherein the gateway entity is further configured to detect the at least one characteristic of the destination device in the second network and store it.

5. The system according to claim 1, wherein the gateway entity is further configured to push information concerning the at least one characteristic of the destination device to the node entity.

6. The system according to claim 1, wherein the gateway entity is further configured to receive the request from the node entity for information related to the at least one characteristic of the destination device and wherein the gateway entity is further configured to deliver information upon the request.

7. The system according to claim 1, wherein the node entity is a digital subscriber line access multiplexer (DSLAM).

8. The system according to claim 1, wherein the second network is a home network and the gateway entity is a home gateway device.

9. A gateway device for routing data streams between a first network and a second network, the gateway device configured to receive a data stream from the first network intended for a destination device in the second network wherein, the gateway device comprising:
a communicative connection to a communication link to a node entity in the first network; and
a communicative connection to the second network;
and wherein the gateway device is further configured to:
receive the data stream from the first network over the communication link, wherein the first network is a wide area network;
identify, by retrieving from memory, at least one characteristic of the destination device, wherein the at least one characteristic is device brand and model, screen size, size or amount of memory in the destination device, or type of memory in the destination device; and
transmit, via the communication link, the at least one characteristic of the destination device to the node entity in the first network, wherein transmission of the at least one characteristic is relatable to the data stream by at least one of inclusion of further identifying data in the transmission, or the transmission being responsive to a request from the node entity for information related to the at least one characteristic of the destination device.

10. The gateway device according to claim 9, further configured to detect characteristics of the destination device in the second network and store them.

11. The gateway device according to claim 9, further configured to transmit characteristics of the destination device to the first network upon request by the first network.

12. The gateway device according to claim 9, further configured to comprise a network address translation table for identifying the destination device.

13. A method of managing a data stream between a first network and a second network, the data stream transmitted from a node entity in the first network through a gateway device situated at a boundary between the first network and the second network to a destination device in the second network, the method comprising:
the gateway device receiving the data stream from the first network, wherein the first network is a wide area network;
the gateway device identifying, by retrieving from memory, at least one characteristic of the destination device, wherein the at least one characteristic is device brand and model, screen size, size or amount of memory in the destination device, or type of memory in the destination device;
the gateway device transmitting the at least one characteristic of the destination device to the node entity in the first network, wherein transmission of the at least one characteristic is relatable to the data stream by at least one of inclusion of further identifying data in the transmission, or the transmission being responsive to a request from the node entity for information related to the at least one characteristic of the destination device;
the node entity receiving the at least one characteristic of the destination device from the gateway device;
the node entity relating the at least one characteristic of the destination device to the data stream based on at least one of the further identifying data in the transmission of the at least one characteristic of the destination device, or the at least one characteristic of the destination device having been received in response to the request from the node entity; and
the node entity performing Quality of Service management on the data stream based on the at least one characteristic of the destination device related to the data stream.

14. The method according to claim 13 wherein performing Quality of Service (QoS) management on the data stream comprises carrying out an action that is at least one of: limiting a rate of delivery of the data steam; blocking the data stream; guaranteeing a bandwidth of the data stream; setting a priority parameter in the data stream; or identifying a group of data streams and setting relative priority parameters of the group of data streams.

15. The method according to claim 13, wherein the data stream comprises a first address of the destination device and wherein the first address is an address in the first network, and wherein the method further comprises:
the gateway device transmitting the at least one characteristic of the destination device to the node entity, wherein transmission of the at least one characteristic is relatable to the first address of the destination device by at least one of inclusion an indication of the first address in the transmission, or the transmission being responsive to the request.

16. A node entity comprised in a first network and configured to transmit a data stream addressed to a destination device in a second network, wherein the node entity comprises:
- a communicative connection to the first network; and
- a communicative connection to the second network;
- and wherein the node entity is further configured to:
- transmit the data stream from the first network to the second network, wherein the first network is a wide area network;
- receive at least one device characteristic of the destination device from the second network, wherein the at least one device characteristic is device brand and model, screen size, size or amount of memory in the destination device, or type of memory in the destination device;
- relate the at least one device characteristic of the destination device to the data stream based on at least one of further identifying data in the transmission of the at least one characteristic of the destination device, or the at least one characteristic of the destination device having been received in response to a request from the node entity; and
- perform Quality of Service management on the data stream based on the at least one characteristic of the destination device related to the data stream.

* * * * *